United States Patent
Duepmeier et al.

(10) Patent No.: US 12,510,309 B2
(45) Date of Patent: Dec. 30, 2025

(54) HEAT EXCHANGER PLATE AND METHOD FOR PRODUCING A HEAT EXCHANGER PLATE

(71) Applicant: BENTELER AUTOMOBILTECHNIK GMBH, Paderborn (DE)

(72) Inventors: Tobias Duepmeier, Paderborn (DE); Guenter Fortmeier, Delbrueck (DE); Elmar Grussmann, Altenbeken (DE); Carsten Bickmann, Lichtenau (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 136 days.

(21) Appl. No.: 18/586,898

(22) Filed: Feb. 26, 2024

(65) Prior Publication Data
US 2024/0288229 A1    Aug. 29, 2024

(30) Foreign Application Priority Data
Feb. 27, 2023    (EP) .................................... 23158875

(51) Int. Cl.
*F28F 3/12*    (2006.01)
*B23K 1/00*    (2006.01)
*B23K 101/14*    (2006.01)

(52) U.S. Cl.
CPC .............. *F28F 3/12* (2013.01); *B23K 1/0012* (2013.01); *B23K 2101/14* (2018.08); *F28F 2255/14* (2013.01)

(58) Field of Classification Search
CPC ...... F28F 3/12; F28F 2255/14; B23K 1/0012; B23K 2101/14
(Continued)

(56) References Cited

U.S. PATENT DOCUMENTS 4,700,445 A * 10/1987 Raskin ...................... F28F 3/14
29/890.039
4,898,153 A * 2/1990 Sherwood ............... F24S 10/73
126/711

(Continued)

FOREIGN PATENT DOCUMENTS

CA          2520238 A1    3/2007
DE   102010051106 A1    5/2012
(Continued)

OTHER PUBLICATIONS

Office Action in JP Application No. 2023-216946, mailed Mar. 19, 2025, 4pp.
(Continued)

*Primary Examiner* — Jon T. Schermerhorn, Jr.
(74) *Attorney, Agent, or Firm* — HAUPTMAN HAM, LLP

(57) ABSTRACT

A cooling plate for battery cooling has a plate body formed from two plate elements and a connecting piece for a cooling fluid. The connecting piece has a connection section which is joined in a receiving section of the plate body formed between the plate elements. The connection section has two arcuate wall sections in cross section and two opposing, outwardly directed longitudinal webs. The receiving section has longitudinal grooves extending between the plate elements in the area of the joining plane. The longitudinal webs run in the longitudinal grooves.

14 Claims, 8 Drawing Sheets

(58) Field of Classification Search
USPC .......................................................... 165/170
See application file for complete search history.

(56) References Cited

U.S. PATENT DOCUMENTS

| | | | |
|---|---|---|---|
| 8,418,517 B2 | 4/2013 | Uneno | |
| 10,006,571 B2 * | 6/2018 | Brunschwiler | F16L 21/03 |
| 12,317,448 B2 * | 5/2025 | Wu | H05K 7/20 |
| 2011/0232882 A1 * | 9/2011 | Zaffetti | F28F 3/12 |
| | | | 165/168 |
| 2011/0232887 A1 | 9/2011 | Zaffetti et al. | |
| 2013/0161942 A1 | 6/2013 | Balbo Di Vinadio | |

FOREIGN PATENT DOCUMENTS

| | | | | |
|---|---|---|---|---|
| DE | 102010051106 B4 | 5/2017 | | |
| EP | 2372761 A2 | 10/2011 | | |
| EP | 2607832 A1 | 6/2013 | | |
| EP | 3121520 B1 * | 9/2018 | ........... | F28D 1/0477 |
| EP | 3741876 A1 | 11/2020 | | |
| EP | 3121548 B1 * | 7/2022 | ................ | F28F 1/14 |
| JP | 2016-031798 A | 3/2016 | | |
| JP | 2018-501603 A | 1/2018 | | |
| JP | 2021-512452 A | 5/2021 | | |
| WO | 2009/104575 A1 | 8/2009 | | |

OTHER PUBLICATIONS

Extended European Search Report for European Application No. 23158875.7 mailed Aug. 11, 2023; 8pp.

* cited by examiner

HEAT EXCHANGER PLATE AND METHOD FOR PRODUCING A HEAT EXCHANGER PLATE

RELATED APPLICATIONS

The present application claims priority of European Application Number 23158875.7 filed Feb. 27, 2023, the disclosure of which is hereby incorporated by reference herein in its entirety.

FIELD

The present disclosure relates to a heat exchanger plate and a method for producing heat exchanger plates.

BACKGROUND

Heat exchanger plates are used for a wide variety of applications. A heat exchanger plate of the type in question is a cooling plate for cooling the batteries of motor vehicles.

The increased demands on electric vehicles in terms of range, driving performance and charging time mean that the thermal stress on the batteries increases due to overheating or aging. To reduce these harmful effects, the operating temperature of a battery is limited by means of temperature control elements through which media flows. The temperature control elements are heat exchanger plates in the form of cooling plates that are arranged above, to the sides, and/or below a battery module.

Heat exchanger plates of conventional design have joined aluminum sheets or extruded aluminum profiles, which allow temperature control medium or cooling fluid to flow through the heat exchanger plates via connecting pieces. The connecting pieces are manufactured by shaping or by machining and connected to the plate body of a cooling plate. The connecting pieces are designed to enable quick installation of cooling fluid lines.

According to EP 2 372 761 B1, a cooling plate with a plate body formed from two plate elements, in which fluid connections or connecting pieces for cooling fluid are arranged on a flat surface of a plate element parallel to the surface of the plate element.

In the cooling plate known from EP 2 607 832 A1, the supply and discharge of cooling fluid takes place via connector pieces which are able to be inserted into a receptacle on the plate element with a connection section.

In the battery cooling plate described in EP 3 741 876 A1, the plate body is likewise formed from two plate elements and has connecting pieces for cooling fluid, wherein a connecting piece is aligned parallel to the plane of the plate elements and joined to a connection section in a receiving section of the plate body.

DE 10 2010 051 106 B4 describes a cooling plate that has at least one cooling duct for conducting a coolant, which duct is provided with at least one inlet and at least one outlet. The cooling plate has at least two plate elements lying flat against one another, in which bulges are formed which together form a cooling duct. The inlet and the outlet are each provided with a connecting piece for connecting the cooling duct to a coolant connection unit.

SUMMARY

The present disclosure is based on the problem of creating a functionally and technically improved heat exchanger plate and of demonstrating a method for producing a heat exchanger plate, which ensures an assembly-friendly, process-reliable and favorable joining of a connecting piece to the plate body of a heat exchanger plate.

The solution to the objective part of the problem is a heat exchanger plate described throughout the present disclosure.

A heat exchanger plate has a plate body formed from two plate elements and connecting pieces for the supply and discharge of a cooling fluid. The plate elements are a duct plate and a base plate, which are brought together to form a plate stack and joined together to form the plate body. The connecting pieces are joined to the plate body. At least one connecting piece has a connection section which is joined in a receiving section of the plate body formed between the plate elements. The orientation of the connection section of the connecting piece is parallel to the plane of the plate elements. Outside the plate body, the connecting piece is able to have arched and/or curved sections. The part of the connecting piece that runs outside the plate body is configured as a coupling section for connecting a connecting line for a cooling fluid.

The plate elements include light metal or a light metal alloy, for example, an aluminum alloy.

At least one plate element of the plate body of the cooling plate has a duct structure for conducting a cooling fluid.

According to the present disclosure, the connection section has two outwardly directed longitudinal webs and the receiving section has longitudinal grooves extending in the area of the joining plane between the plate elements, the longitudinal webs running in the longitudinal grooves.

The plate elements are joined by soldering, incorporating the connection section of the connecting piece in the receiving section of the plate body. The longitudinal webs and the longitudinal grooves complement each other. The contour or configuration of the longitudinal webs and the longitudinal grooves ensures a technologically necessary joining gap. The joining surfaces are optimized. The joining gap, such as in the width of the joining gap, is uniform over the circumference or the course between the connection section and the receiving section without any jumps in thickness. The gap width is small. A high-strength, tight connection by material bond of the connecting piece with its connection section in the receiving section of the plate body is achieved.

The connection section has two convexly curved wall sections that extend between the longitudinal webs. In at least one embodiment of the present disclosure, the wall sections are curved elliptically or in the shape of an elliptical section.

The two curved wall sections run mirror-symmetrically to a transverse axis of the connection section, such as in the central longitudinal axis, and each transition into a longitudinal web. The wall sections are convexly curved towards the center or the central longitudinal axis of the connection section. In the web sections, the side surfaces are concavely curved.

In one embodiment of the connection section, the connection section of the connecting piece has an elliptical or elliptically shaped outer contour in cross section with outwardly directed longitudinal webs lying opposite one another on a transverse axis.

In at least one embodiment of the present disclosure the connection section is able to have upper and lower wall sections that are flattened in cross section, such as middle wall sections, which each transition into longitudinal web at the ends via convexly curved wall sections.

The receiving section of the plate body forms an insertion or joining area for the connection section of the connecting piece.

The connecting piece has longitudinal webs in the connection section on both sides that extend in the longitudinal direction of the connecting piece. These are triangular in cross-section with concave web walls and a rounded tip. The contour of the longitudinal webs ensures a smooth transition from the elliptical outer contour to the longitudinal webs with rounded outer surfaces without steps or sharp curves or angles.

The longitudinal grooves of the receiving section are configured in a funnel-shaped cross section with concave groove cheeks and a wedge-shaped groove base in relation to the center point or the central longitudinal axis of the connecting piece and the receiving section. The inner contour in the area of the inner corner of the receiving section formed by the groove cheeks is rounded along the groove cheeks. The groove base at the transition from the receiving section to the plate elements that come into contact with one another is acute-angled.

The configuration of the longitudinal webs and the longitudinal grooves is that these are designed to complement each other. The contours of the longitudinal web and the longitudinal groove complement each other in such a way that the longitudinal webs interact in the longitudinal grooves in the manner of a tongue and groove connection, wherein a joining gap is formed between the contours.

The connection section has two convexly curved wall sections. These each extend between the opposing longitudinal webs and transition into the concave web walls.

The receiving section has convexly curved inner wall sections, which are adjoined by the concave groove cheeks.

The information "convex" and "concave" refers to the center point and the longitudinal axis of the connecting piece, respectively. A convex surface, a convex wall, or a convex wall section is a surface or section that is curved outwards from the center or the central longitudinal axis of the connecting piece.

A concave surface, a concave wall section, or a concave groove cheek is a surface, section or cheek that is arched or curved inwards with respect to the center point or the central longitudinal axis of the connection section.

In cross section, the connection section of the connecting piece as well as the receiving section are designed mirror-symmetrically to the horizontal central transverse axis and to the vertical central transverse axis.

The cross-sectional contour of the connection section is able to be described as a lemon shape or lemon-shaped, wherein the cross-section indication is based on a longitudinal section through a lemon. This means that the connection section is configured ellipse-shaped and has a major axis and a minor axis in cross section. The major axis and the minor axis are perpendicular to each other and intersect at the center along the central axis of the connecting piece. The major axis describes the largest dimension of the connecting piece in the connection section, whereas the minor axis describes the smallest dimension of the connection section in a radially outward direction. Relative to the joining plane of the plate elements of the plate body, the major axis extends in the joining plane and corresponds to the horizontal central transverse axis. The minor axis corresponds to the vertical central transverse axis.

The cross section of the connecting piece in the connection section is symmetrical with respect to the major axis and the minor axis.

The longitudinal webs lie opposite each other on the major axis and are shaped outwards from the wall of the connecting piece.

As explained, the longitudinal webs are able to be triangular in cross section with rounded, concave web walls and a rounded tip. The rounded tip forms the top of a side web.

A joining gap is formed between the connection section of the connecting piece and the receiving section of the plate body. A technologically necessary and advantageous joining gap is ensured by the close-contour shaping of the flange geometry of the connecting piece and the receiving section and their alignment to one another. In at least one embodiment of the present disclosure the cross section of the joining gap has a narrow or small circumferential width which is uniformly small over the majority of the circumferential length of the joining gap, which is advantageous. The soldering gap is also small in the area between the tips of the longitudinal webs and the wedge-shaped groove base of a longitudinal groove.

A solder material is applied between the connection section and the receiving section. The plate elements with each other as well as the plate elements and the connecting piece are joined using soldering. This is able to be achieved in terms of manufacturing technology and process reliability as well as cost-effectively. The components are joined using soldering technology in a mold soldering tool in which the plate elements are pressed together at the joining surfaces, the receiving section of the plate body formed from the two plate elements is shaped in its final form, the duct is formed in the plate body, and the components are heated to soldering temperature and joined together using soldering.

Combined molding and soldering takes place in the mold soldering tool. In the mold soldering tool, the duct and the duct structure in the plate body are formed, the connection section of the plate body is shaped in its final form, and the plate elements are soldered to one another and the plate elements or the receiving section and the joining section of the connecting piece are soldered to one another. During the soldering process, the components are clamped and pressed together in the mold soldering tool.

In at least one embodiment of the present disclosure, the forming properties of the ductile solder material to seal the connecting piece in the receiving section. The connection section of the connecting piece is preformed at least close to the final contour. Here, the connection section receives its cross-sectional configuration with two longitudinal webs directed outwards on a transverse axis and the arcuately curved wall sections that extend between the longitudinal webs. The connecting piece is shaped by forming, using an internal mandrel.

A solder material is applied to the connection section of the connecting piece. The solder material in the area between the connection section and the receiving section is able to be preapplied to the two shaped sections of the plate elements or the connecting contours. In an advantageous embodiment and procedure, a solder material is applied in the connecting contours or on the connection section, for example in the form of solder material layers or solder material sleeves. As already mentioned, solder material is able to be preapplied in a suitable amount to the shaped sections and the connecting contours of the plate elements. The solder material is able to be applied to the connection section, for example in the form of a soldering strip or a soldering sleeve made of a low-melting solder material, such as an aluminum-based solder material.

The plate elements are transferred to a heatable mold soldering tool, which has an upper tool and a lower tool. For this purpose, a plate stack is able to be formed from the two plate elements outside the mold soldering tool, wherein the connecting piece with its connection section is already able to be positioned between the shaped sections of the plate elements in the connecting contours. This stack of plates is then transferred to the mold soldering tool.

A plate stack with an integrated connecting piece is also able to be formed in the mold soldering tool. For this purpose, the plate elements are positioned in the mold soldering tool by incorporating the connecting piece. In the mold soldering tool, the connection section is positioned between shaped sections of the plate elements and the connection contours provided there. The shaped sections are able to be formed on PCB sections of the plate elements that protrude from the base body of the plate elements.

When the mold soldering tool is closed, the plate stack formed from the two plate elements with the integrated connection section of the connecting piece is clamped in the mold soldering tool. In this process, the connection contours in the shaped sections of the plate elements are shaped in their final form around the connection section of the connecting piece. The shaped sections of the plate elements are shaped in their final form and form the receiving section. The outer contour of the connection section specifies the inner contour of the receiving section. The formed shaped sections complement each other to form the receiving section. The receiving section has convexly curved inner wall sections. In the area of the joining plane between the plate elements, longitudinal grooves extending in the longitudinal direction of the receiving section are formed. The longitudinal grooves have a funnel-shaped cross-section and have concave groove cheeks and a wedge-shaped groove base. The groove cheeks adjoin the curved inner wall sections of the receiving section.

During the molding process and the formation of the contour of the receiving section in the mold soldering tool, the solder material applied around the connecting piece is compressed radially and pressed in such a way that the ductile solder material flows into the joining gap that forms between the connection section and the receiving section.

Clamped in the mold soldering tool, an intermediate space between the plate elements of the plate stack is subjected to internal pressure. This is done by introducing an active medium via the connecting piece. At least one duct is formed in at least one plate element by internal pressure forming.

As a result of heating the plate elements or the plate stack clamped in the soldering tool, the solder material between the plate elements and between the connection section and the receiving section is melted and the components are joined in a materially bonded manner.

In at least one embodiment of the present disclosure, the connecting piece has a stop. A stop is designed in the form of an annular bead. The stop or the annular bead rests on the end face of the connecting piece. The position of the connecting piece in the axial insertion direction relative to the plate body is determined by the stop, which comes into contact with the connecting piece on the end face thereof. Furthermore, there is an axial seal through the stop or the annular bead at the opening of the connecting piece.

In at least one embodiment of the present disclosure, a solder stop means is provided, which limits the flow of solder when producing the solder connection. The solder stop means is arranged between the connecting piece and the receiving section, such as the solder stopping means is arranged between the connection section of the connecting piece and the receiving section.

In at least one embodiment of the present disclosure, a solder stop means is arranged on the open side of the receiving section. Open side means that the solder stop means is applied in the area of the opening of the receiving section inside the receiving section or outside on the end face around the opening of the receiving section.

In at least one embodiment of the present disclosure, the solder stop means is designed by a cross-sectional change in the connection section of the connecting piece and in the receiving section. The solder stop means is formed by the cross-sectional change in the joining area between the receiving section formed in the shaped sections of the plate elements and the connecting piece. Both the connection section and the receiving section have two length sections with different cross sections. The length sections of the connection section, as well as the length sections of the receiving section, transition into one another via a taper section.

The changes in cross-section in the connection section and in the receiving section complement each other and there is a reduction in the cross-section of the annular space between the connection section and the receiving section. The solder material that melts during the soldering process is stopped in the cross-sectional change between the connection section and the receiving section. This limits the solder flow when producing the soldered connection.

In at least one embodiment of the present disclosure, the solder stop means is formed from a sealing metal. The sealing metal becomes soft and viscous under the influence of temperature in the soldering tool. The result is a flowable, homogeneous sealing compound which, under the pressure in the soldering tool, prevents the molten solder material from flowing into undesirable or technologically disadvantageous areas. The sealing metal has a higher melting temperature than the solder material used for the mold soldering process.

The solder stop means is designed and intended to limit the flow of solder when making the soldered connection. The solder stop means is also set up and designed and positioned to prevent blowing out of the solder material that is still molten during the internal pressure forming of the plate elements to form the duct.

A solder stop means is also able to be formed from a solder material. As a result, two solder materials with different material properties are applied. A solder material of the first type is the solder material that is applied to or around the connection section of the connecting piece. A solder material of the second type has a higher melting temperature than the solder material of the first type and forms the solder stop means. The solder material of the second type melts later when the connecting piece and the receiving section is heated in the hot forming tool and is tougher than the solder material of the first type under the temperature effect of the hot forming tool and is therefore thicker or more viscous. In this way, the solder material of the second type forms a solder stop means for the solder material of the first type.

The solder stop means is also able to be implemented differently, for example in the form of a mechanical solder stop lock, such as a solder stop ring. The outer annular bead which lies against the receiving section on the end face can also seal the opening with solder material.

Two different solder stop means or types of solder stop means are also able to be used in combination. A solder stop means is able to be provided in the form of a cross-sectional change in the connection section of the connecting piece and a cross-sectional change designed to complement this in the receiving section. Furthermore, a solder stop means is able to be provided in the form of a mechanical solder stop barrier, such as a separate ring body made of a solder stop material or a solder stop ring formed in one piece in the connecting piece using the same material.

The connecting piece has the connection section via which the joining takes place in the receiving section of the plate body. On the inlet side, the connecting piece has a coupling section. The coupling section is used to connect a cooling fluid line. In the coupling section, the connecting piece has a circular cross section. From the circular cross section in the coupling section, the connecting piece transitions into the connection section via a transition section.

In at least one embodiment of the present disclosure, the connecting piece has a coupling section with an abutment. The abutment serves to connect a connection line for a cooling fluid. The abutment body is designed in the form of an annular bead in the rear coupling section. The annular bead is made of the same material and is an integral component of the coupling section.

A connection section is able to be provided upstream and/or downstream of the connection section, with a different cross section than that of the connection section, for example with a round or elliptical cross section without longitudinal webs.

In at least one embodiment of the present disclosure, the connection section of the connecting piece has two length sections, wherein the two length sections have a cross section that differs from one another. A first or front length section on the plate body side has a larger cross-sectional area than a second or rear length section of the connection section. The front or first length section has the cross-sectional configuration with lateral longitudinal webs. The first length section and the second length section are connected to one another via a transition or a connection section.

The receiving section is designed to complement the design of the length sections of the connection section. The receiving section also has a front length section on the plate body side. This has a different cross-sectional configuration than a second rear length section of the receiving section which adjoins via a transition. The cross-sectional area of the front first length section of the receiving section is larger than the cross-sectional area of the rear second length section of the receiving section.

In at least one embodiment of the present disclosure, an advantageous and quick, assembly-friendly, process-reliable connection between one or more connecting pieces and the plate body of a heat exchanger plate, such as a cooling plate. A high level of process stability is guaranteed. The connection is efficient and has the tightness required for the component.

The connection sections of the connecting piece are oriented parallel to the plate elements in the joining plane of the plate elements. This contributes to a reduction in flow resistance through a parallel cooling fluid entry or exit. Due to the parallel alignment of the connecting pieces to the surface plane of the plate elements and the plate body, a laminar flow of the cooling fluid occurs without abrupt deflection, swirls, or turbulence.

In at least one embodiment of the present disclosure, the connecting piece and the receiving section realizes a larger connection area of the connecting piece to the heat exchanger plate. This results in an overall increase in robustness and voltage peaks are reduced.

Finally, the heat exchanger plate, and its production also contribute to a reduction in scrap rate, since downstream joining operations are eliminated or at least reduced.

A method for producing a heat exchanger plate with a connecting piece has the following steps:
  providing a connecting piece which has a connection section with two outwardly directed longitudinal webs;
  providing a first plate element and a second plate element, wherein the first plate element and the second plate element have a receiving contour for the connection section;
  transferring the first plate element and the second plate element into a heated mold soldering tool which has a lower tool and an upper tool, the connection section of the connecting piece being positioned between shaped sections of the plate elements and a solder material being arranged between the connection section and the plate elements;
  closing the mold soldering tool and clamping the plate stack between the lower tool and the upper tool, wherein the receiving contours in the shaped sections of the plate elements are shaped in their final form around the connection section of the connecting piece and a receiving section with longitudinal grooves extending in the area of the joining plane between the plate elements is formed;
  heating the plate stack;
  applying internal pressure to a gap between the plate elements of the plate stack by introducing an active medium into the gap via the connecting piece and forming a duct in at least one plate element;
  melting the solder material between the plate elements and between the connection section and the receiving section and joining using soldering;
  opening the mold soldering tool and removing the cooling plate from the mold soldering tool.

The method is improved in terms of process technology and enables the production of high-quality heat exchanger plates with an optimized connection of the connecting pieces thereto in an efficient manner.

A heat exchanger plate has multiple connecting pieces, such as a plate body has a connecting piece for supplying and a connecting piece for discharging a cooling fluid. In at least one embodiment of the present disclosure, all connecting pieces of the plate body and their fastening on or in the plate body between the plate elements.

The mold soldering tool is heatable and heated to a tool temperature required for soldering purposes to produce the heat exchanger plates.

A plate stack is formed from at least two plate elements made of a metallic material, such as a light metal material. A solder material is applied between the plate elements.

A connection contour is shell-shaped or duct-like and configured in such a way that the connecting piece with its connection section is positionable or is able to be positioned between the receiving contours.

In at least one embodiment of the present disclosure plate elements which are provided with a solder material are effectively used, wherein the solder material is applied to at least one of the plate elements in the form of a plated solder layer. Plate elements are provided of which at least one plate element is already provided with a solder material.

A plate stack is formed from the two plate elements. When forming the plate stack, the connecting piece is positioned with its connection section between the plate elements. For this purpose, the connection section is arranged between shaped sections on the plate elements and the connection contours preformed there.

The stack of plates is placed in the hot forming tool and the hot forming tool is closed. The plate stack is able to be formed outside the hot forming tool and brought into the hot forming tool. The plate stack is able to only be formed inside the hot forming tool.

The mold soldering tool has a lower tool and an upper tool. These are displaced relative to one another during the closing movement of the mold soldering tool, such as the upper tool is lowered onto the lower tool. During the closing movement, the stack of plates is picked up and clamped between the lower tool and the upper tool. The plate stack comes into surface contact between the lower tool and the upper tool and is heated in the mold soldering tool. The mold soldering tool is heated to a tool temperature at which both the forming process and the joining process by soldering are carried out. The tool temperature is between 540° C. and 670° C. The tool temperature is also able to be between 550° C. and 640° C.

When the mold soldering tool is closed, the shaped sections of the plate elements are shaped in their final form around the connection section of the connecting piece and the receiving section is formed with the longitudinal grooves extending in the joining plane between the plate elements. The longitudinal webs of the connection section run in the longitudinal direction of the connecting piece. A longitudinal web of the connection section runs in the longitudinal grooves along one long side of the connecting piece in a longitudinal groove in the receiving section.

A space between the plate elements of the plate stack is subjected to internal pressure. A gap is an area between the adjacent plate elements, although there does not necessarily have to be a gap between the plate elements in the area of the gap. The intermediate space is subjected to an internal pressure by introducing an active medium, such as nitrogen, into the intermediate space. In this process, a duct is formed by internal pressure forming at least one plate element area into a duct cavity in one or the contact surfaces of the mold soldering tool. The active medium is supplied via one of the connecting pieces of the plate stack.

The active medium for forming the duct or the duct structure in the plate body is introduced via the connecting piece or one of the connecting pieces.

The solder material between the plate elements and the plate elements and the connecting piece is melted as a result of the tool temperature of the mold soldering tool. The plate elements are joined with each other as well as the connecting piece is joined with the plate elements in the area of the receiving section by soldering.

The mold soldering tool is opened after completion of the mold soldering process, wherein the lower tool and the upper tool are displaced relative to one another and moved apart. The joined warm plate body or the heat exchanger plate is able to be removed from the mold soldering tool after opening it. Before removal, the heat exchanger plate is able to be held in the soldering tool and cooled down. Cooling takes place below the melting temperature of the solder material.

The plate elements include the joining surface are provided with solder material. Before forming the plate stack and positioning the connecting piece, the connection section of the connecting piece is provided with solder material of the first type. Furthermore, the connecting piece is able to be provided with a solder stop means. The solder stop means is also positioned on the connecting piece, for example in the form of a second type solder material, which has a higher melting temperature than the first type solder material.

To position the connecting piece, a stop in the form of an annular bead is able to be provided. The connecting piece is then positioned with the annular bead on the front side of the plate stack formed from the plate elements and the shaped sections provided there.

The plate stack is clamped between the lower tool and upper tool when producing the heat exchanger plates. During the internal pressure forming and formation of the duct, the stack of plates is sealed all the way along adjacent edge regions and/or adjacent to the duct cavity. The sealing is able to be effected or supported by pressure elements provided in the lower tool and/or in the upper tool. Such pressure elements are optional and are also able to be provided in the area of the connecting piece. The pressure elements are able to be formed by appropriate contouring in the shaped sections of the lower tool and/or the upper tool, for example by sealing beads. The sealing elements are able to be provided circumferentially along adjacent edge regions of the upper tool and/or lower tool. The sealing elements are further arranged in such a way that the receiving section with the connection section of the connecting piece arranged therein is clamped and sealed or is clamped and sealed during the expansion process and soldering process. Sealing elements are also able to be provided adjacent to the duct cavity. The sealing elements ensure a forming process, such that the forming process takes place in the area of the duct cavity and in the area of the connecting contour of the connecting piece. In this way, a high level of dimensional stability and forming accuracy is ensured.

In at least one embodiment of the present disclosure, cooling device includes the peripheral components and device components necessary for cooling a vehicle battery, such as cooling fluid lines, storage and expansion tanks for cooling fluid, cooling fluid supply and/or pump units and/or recoolers.

BRIEF DESCRIPTION OF THE DRAWINGS

The invention disclosure is described in more detail hereinafter on the basis of exemplary embodiments illustrated in the drawings. In the figures.

DETAILED DESCRIPTION

Figure 1:
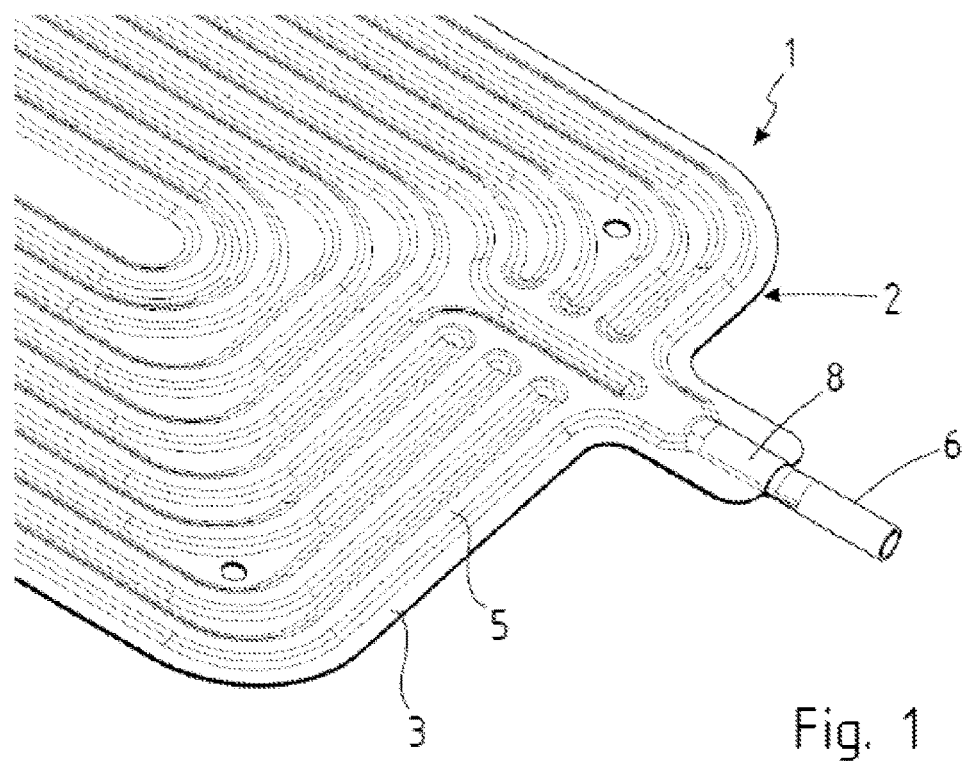
FIG. 1 shows a perspective view from above of a section of a heat exchanger plate according to at least one embodiment of the present disclosure.
Figure 2:
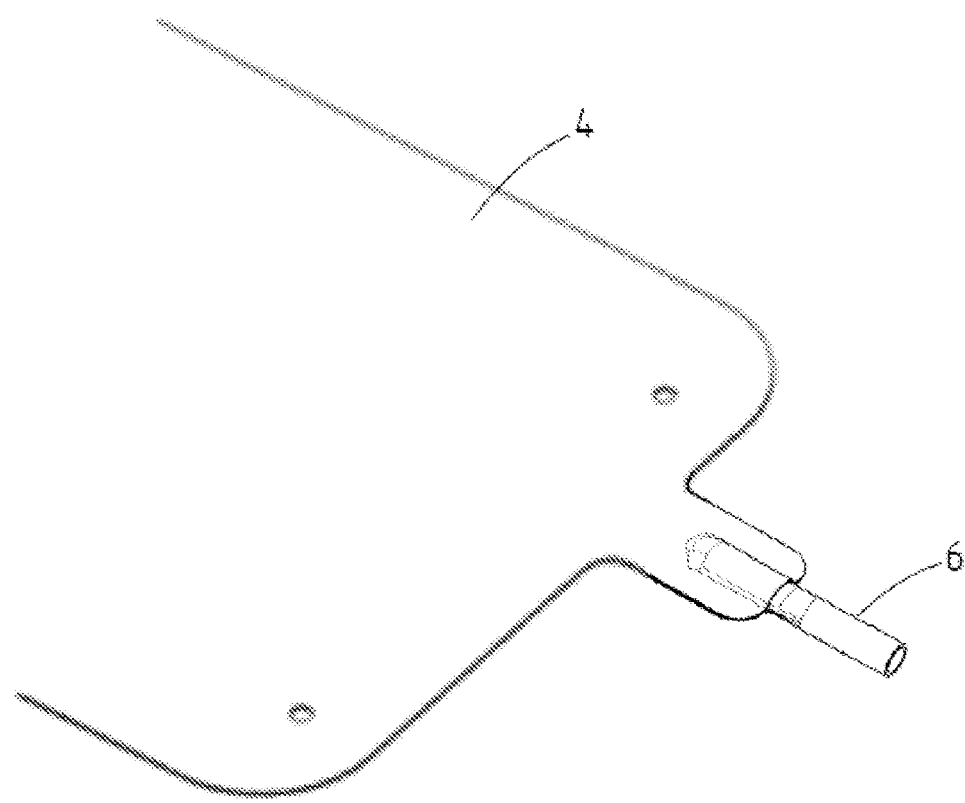
FIG. 2 shows a view from below of section of the heat exchanger plate according to at least one embodiment of the present disclosure.

A heat exchanger plate 1 according to the present disclosure and its production as well as modifications of the connection for a cooling fluid line to a heat exchanger plate 1 are explained with reference to FIG. 1 to FIG. 14. In the figures, the same reference numerals are used for identical or functionally corresponding components or component parts, even if a repeated description is omitted for reasons of simplicity.

FIG. 1 to FIG. 6 serve to explain a first exemplary embodiment of a heat exchanger plate 1.

A second exemplary embodiment of a cooling plate 1 is explained with reference to FIG. 6 to FIG. 10. The cross-sectional representation in FIG. 6 applies to both embodiments of the cooling plate 1. The same applies to the design of a plate body 2 of a cooling plate 1 and the plate elements 3, 4 forming the plate body 2.

Figure 11:
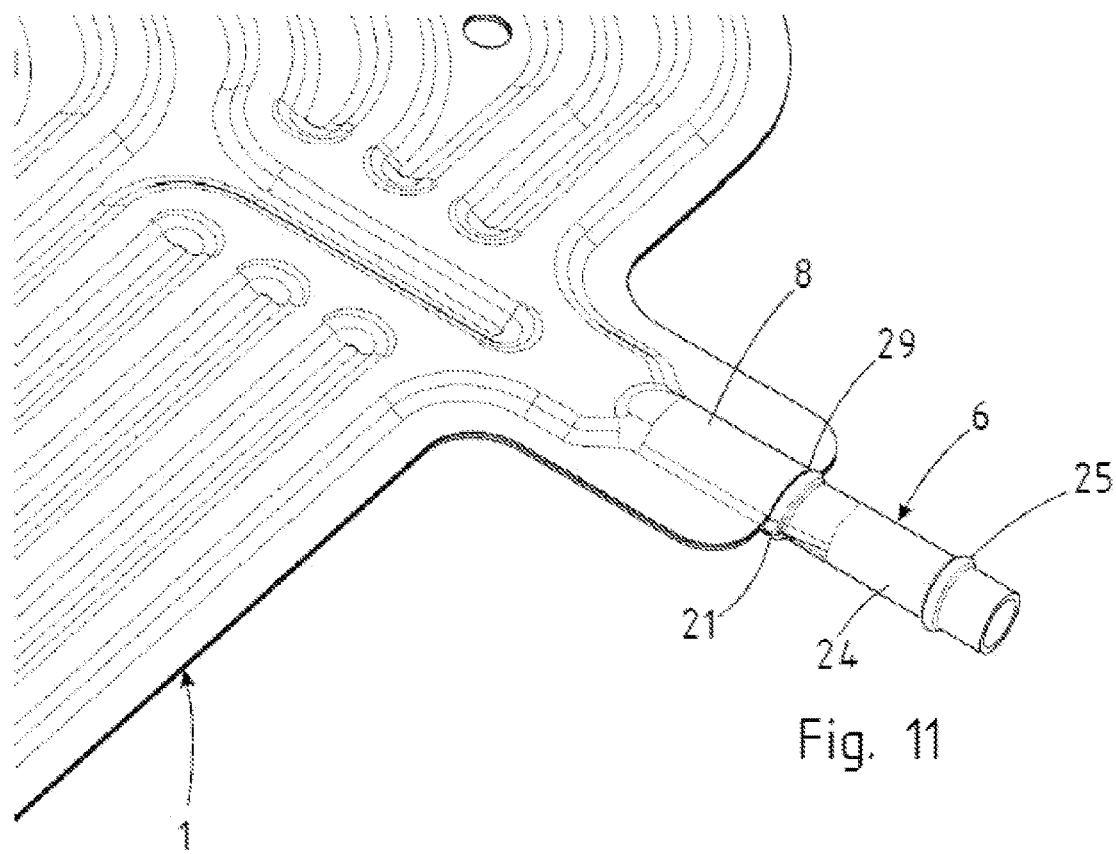
FIG. 11 shows a perspective view of a detail from another embodiment of a heat exchanger plate according to at least one embodiment of the present disclosure.
Figure 12:
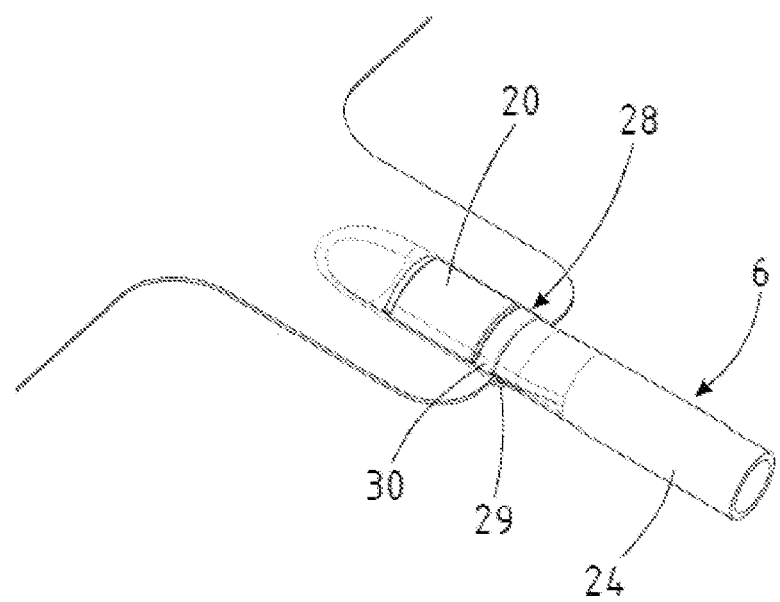
FIG. 12 shows a view of a section of a plate element and the connecting piece positioned in a receiving contour of the receiving section according to at least one embodiment of the present disclosure.
Figure 13:
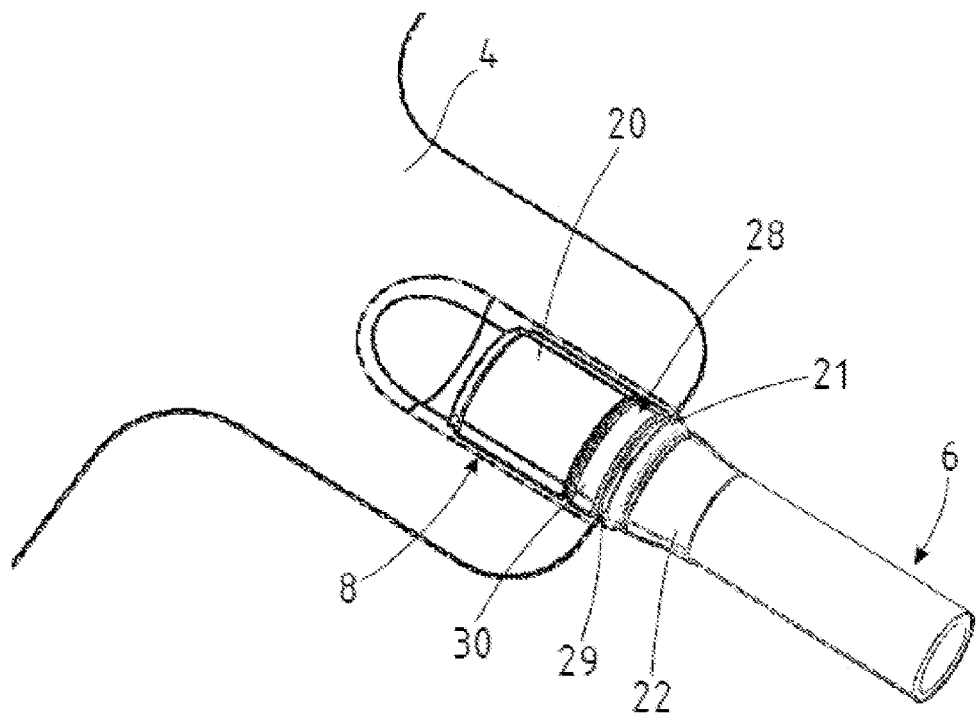
FIG. 13 again shows a section of a plate body with connecting piece with a view of a plate element and a modification in the connection area of the connecting piece according to at least one embodiment of the present disclosure.

FIG. 11 to FIG. 13 show modifications of the connection for a cooling fluid line.

Figure 14:
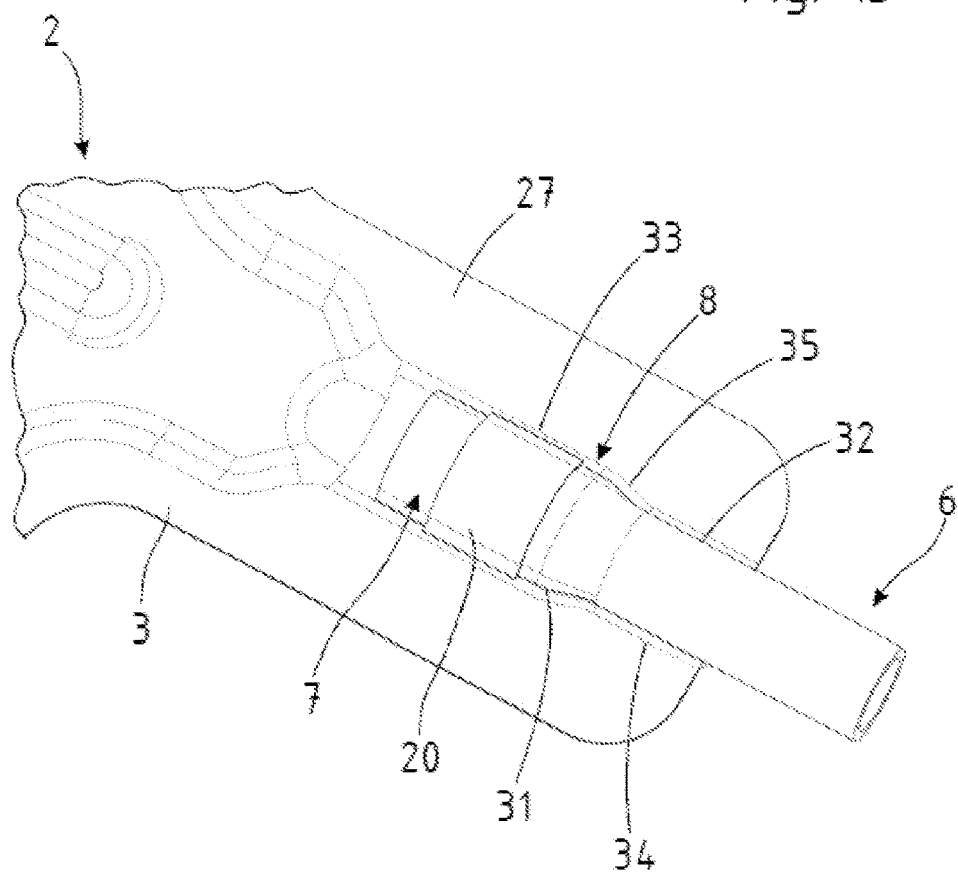
FIG. 14 shows a section of a plate body showing another connection configuration according to at least one embodiment of the present disclosure.

FIG. 14 serves to explain another embodiment of a cooling plate 1 and the configuration of the connection for a cooling fluid line.

The heat exchanger plate 1 is a cooling plate for battery cooling, such as a vehicle battery of a motor vehicle.

The heat exchanger plate 1 has a plate body 2 formed from two plate elements 3, 4. The plate element 3 is a duct plate which has a duct structure including at least one duct 5 (see in FIG. 1, FIG. 5, and FIG. 11). The plate element 4 is a completely or almost completely flat floor plate (see FIG. 2).

The two plate elements 3, 4 are positioned flat on top of each other and form a plate stack. The adjacent surfaces of the plate elements 3, 4 are completely or in sections provided with a solder material. A solder material in the form of a plated solder layer is preapplied to one of the plate elements 3, 4.

The adjacent surfaces of the plate elements 3, 4 are joined together completely or in some sections. A connecting piece 6 for a cooling fluid is connected to the plate body 2. The connecting piece 6 is used to supply or discharge a cooling fluid. In at least one embodiment, one connecting piece 6 is provided for supplying a cooling fluid, whereas a cooling fluid is discharged via another connecting piece 6.

The connecting piece 6 has a connection section 7 which is joined in a receiving section 8 of the plate body 2 formed between the plate elements 3, 4.

The connection section 7 has an ellipse-shaped outer contour in cross section.

The connection section 7 of the connecting piece 6 has a major axis H in cross section and a minor axis N perpendicular thereto. The major axis H corresponds to the central transverse axis and describes the largest dimension of the connection section 7. The major axis H extends in the joining plane FE of the plate elements 3, 4. The minor axis N is the smallest dimension of the connection section 7 in a radially outward direction.

The connection section 7 has two outwardly directed longitudinal webs 9. The longitudinal webs 9 lie opposite one another on the major axis H of the connecting piece 6. The longitudinal webs 9 are an integral component of the connection section 7 using the same material and are directed outwards from the inside of the connecting piece 6.

The connection section 7 of the connecting piece 6 lies in the receiving section 8 of the plate body 2 and is joined there to by material bond. The receiving section 8 has longitudinal grooves 10 extending between the plate elements 3, 4 in the area of the joining plane FE. The longitudinal webs 9 of the connection section 7 run in the longitudinal direction L of the receiving section 8 in the longitudinal grooves 10.

The longitudinal webs 9 and the longitudinal groove 10 are designed to complement each other. This means that the contour of the longitudinal grooves 10 and the contour of the longitudinal webs 9 complement each other to form a joining gap 11. The longitudinal webs and the longitudinal grooves interact like a tongue and groove.

Figure 6:
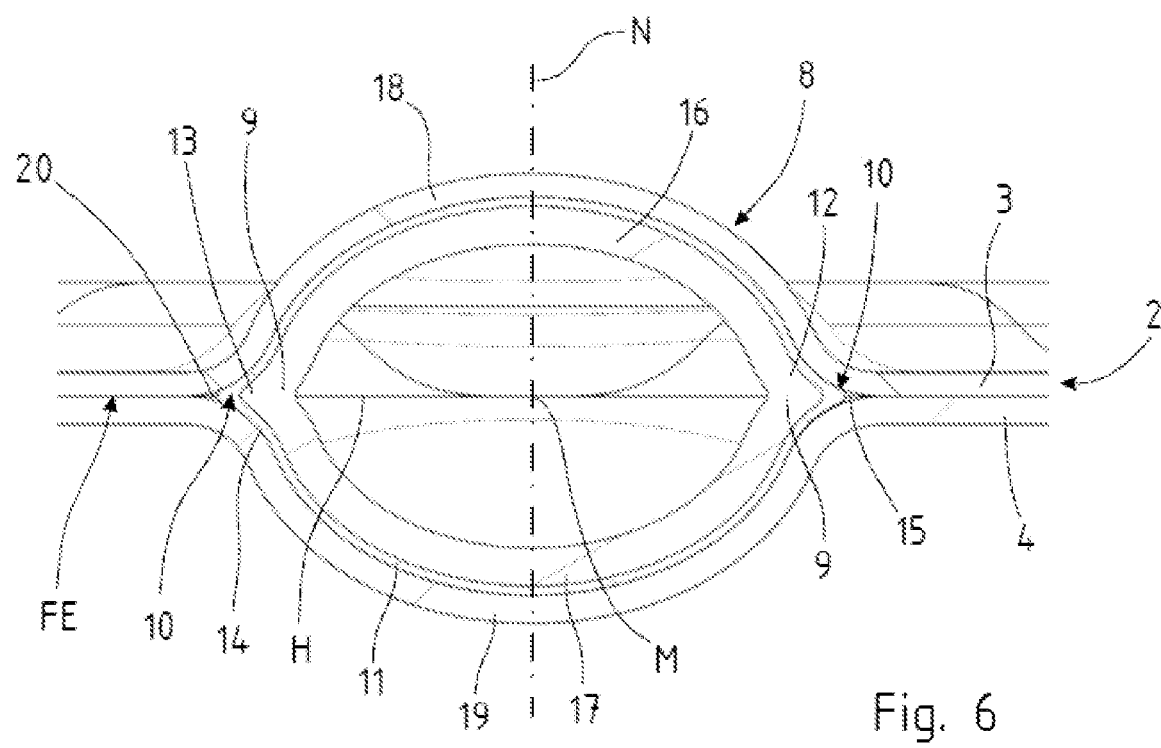
FIG. 6 shows a cross section through the connection area of a connecting piece according to line A-A of FIG. 5 according to at least one embodiment of the present disclosure.
Figure 7:
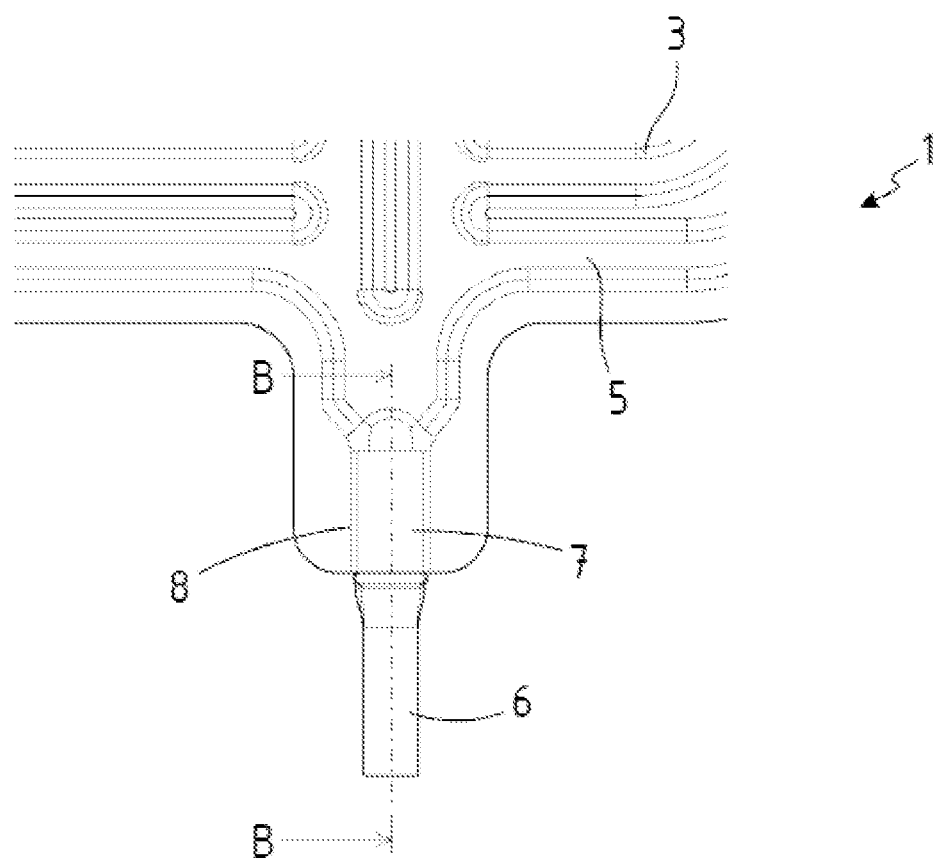
FIG. 7 shows a detail of a plate body in the area of the connecting piece according to at least one embodiment of the present disclosure.
Figure 8:
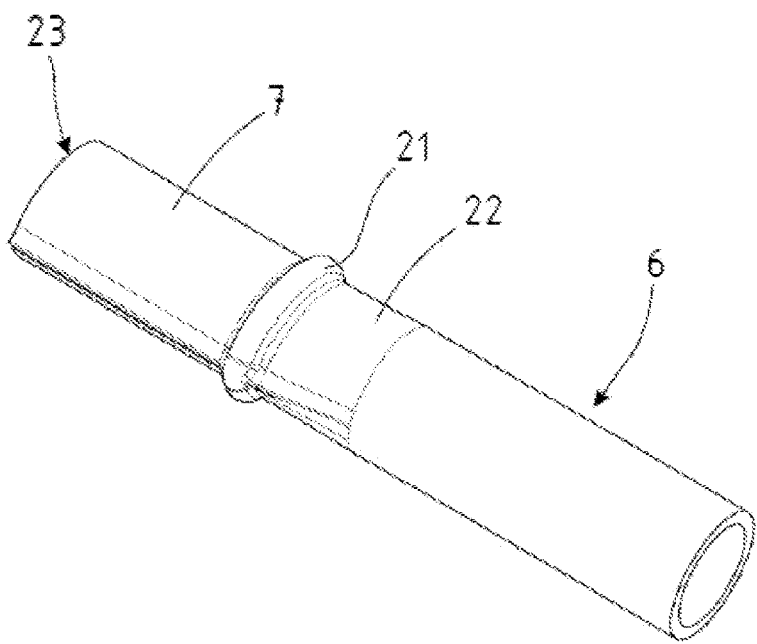
FIG. 8 again shows a perspective view of another embodiment of a connecting piece according to at least one embodiment of the present disclosure.
Figure 9:
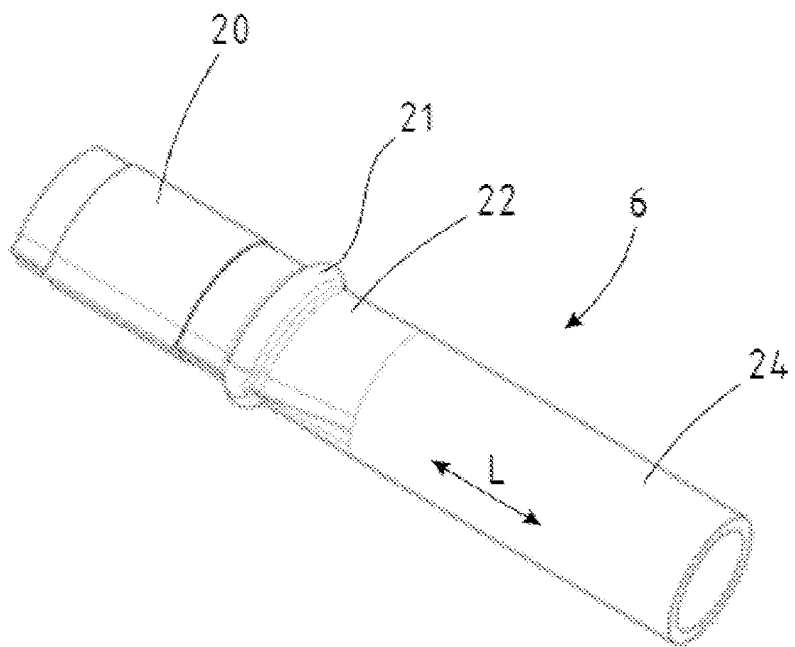
FIG. 9 shows the connecting piece of FIG. 8 with applied solder material according to at least one embodiment of the present disclosure.
Figure 10:
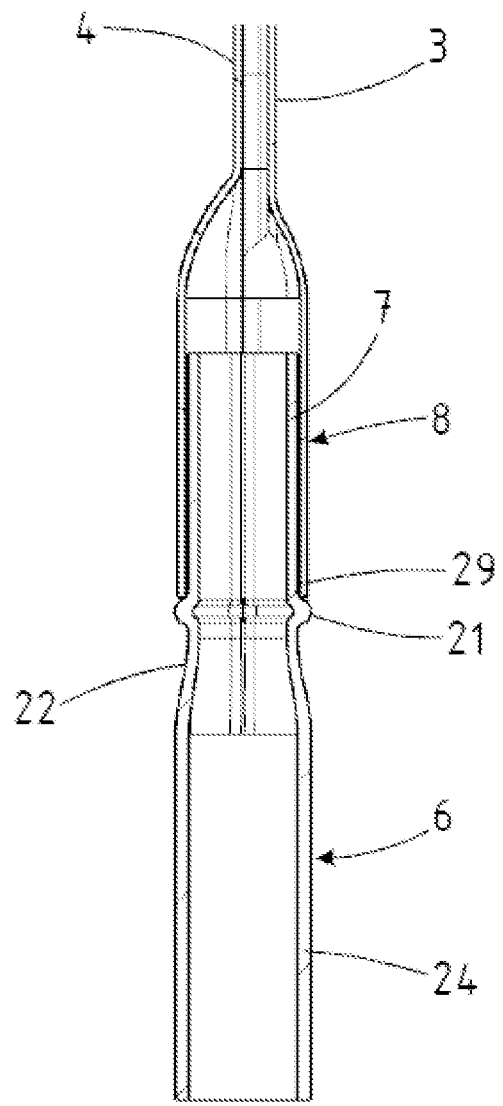
FIG. 10 shows a section through the plate body and the representation of FIG. 7 along line B-B according to at least one embodiment of the present disclosure.

The longitudinal webs 9 are triangular in cross-section and have web walls 12 which are concavely curved and end in a rounded tip 13 (see FIG. 6).

The longitudinal grooves 10 are configured in a funnel-shaped cross section with concave groove cheeks 14 and a wedge-shaped groove base 15. In this regard, reference should also be made to the illustration in FIG. 6.

The indications "convex" and "concave" each refer to the center point M of the connecting piece 6.

The connection section 7 has a convexly curved upper wall section 16 and a convexly curved lower wall section 17. The longitudinal webs 9 adjoin the wall sections 16, 17 on both sides. The wall sections 16, 17 transition into the web walls 12 of the longitudinal webs 9.

The receiving section 8 has convexly curved receiving wall sections 18, 19, each of which transitions into a groove cheek 14.

Figure 3:
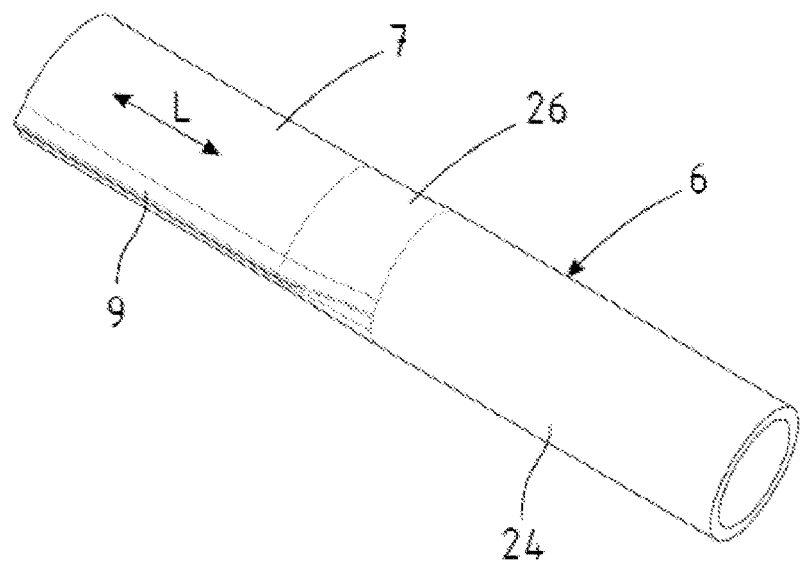
FIG. 3 shows a perspective view of a connecting piece according to at least one embodiment of the present disclosure.
Figure 4:
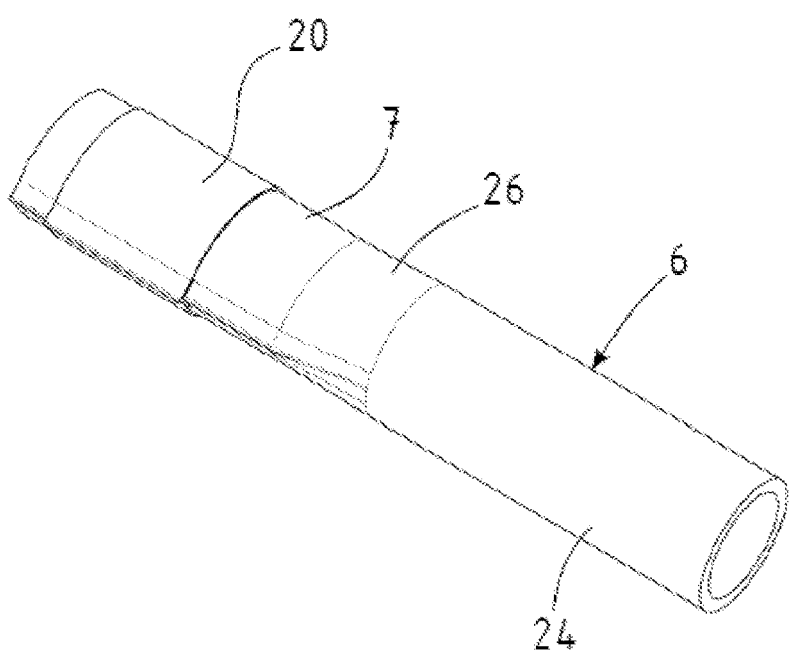
FIG. 4 shows the connecting piece of FIG. 3 with applied solder material according to at least one embodiment of the present disclosure.
Figure 5:
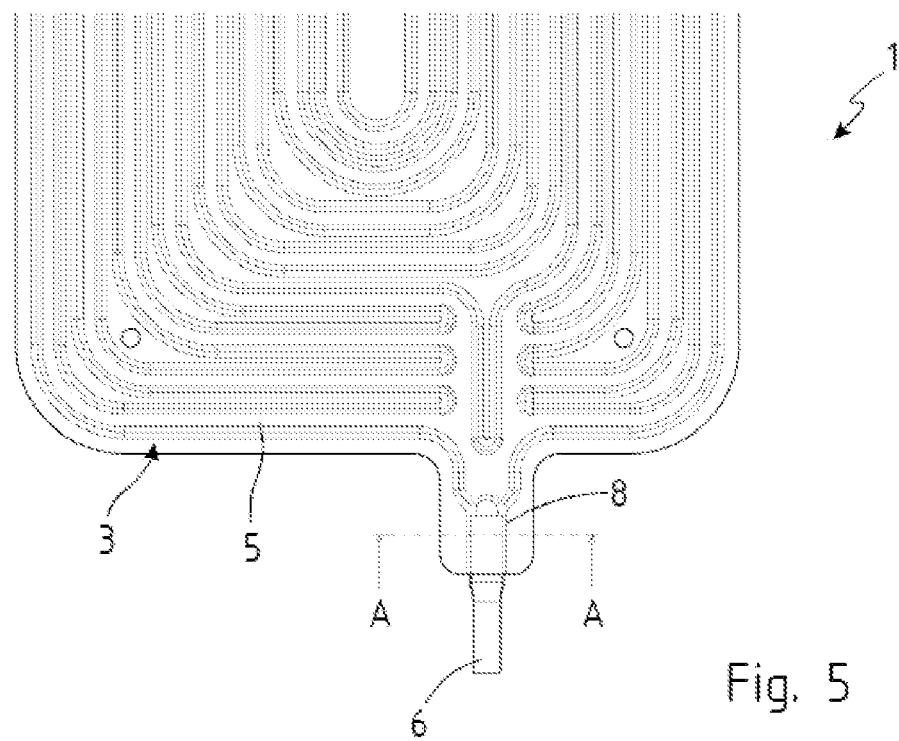
FIG. 5 shows a top view of a section of a plate body of a heat exchanger plate according to at least one embodiment of the present disclosure.

The connection section 7 is cohesively joined in the receiving section 8 by a solder material 20 applied in the joining gap 11. For this purpose, a solder material 20 is placed around the connection section 7 of the connecting piece 6. FIG. 3 shows the connecting piece 6 without and FIG. 4 shows it with the applied solder material 20. When the plate elements 3, 4 and the connection section 7 are joined by soldering, the solder material 20 is melted, the joining gap 11 is wetted and filled with solder material 20 across its entire surface, and the components are joined by material bond.

The cross-sectional contour of the connection section 7 is able to be described as a lemon shape or lemon-shaped, wherein the cross-section indication is based on a longitudinal section through a lemon.

The outer contour of the connection section 7 and the inner contour of the receiving section 8 are designed to complement each other, forming the joining gap 11.

The embodiment of the cooling plate 1, as illustrated with reference to FIG. 6 to FIG. 10, differs in the design of the connecting piece 6. A stop is provided in the connecting piece 6, as seen in FIG. 7 to FIG. 10. The stop is in the form of an annular bead 21. The annular bead 21 is formed from the wall of the connecting piece 6 by swaging and shear pressure forming. For this purpose, the connecting piece 6 is drawn into a constriction area 22, adjoined by the annular bead 21 which is turned outwards. In the direction of the plate body-side opening 23 of the connecting piece 6, the connection section 7 adjoins the annular bead 21. The connection section 7 is configured as previously described and shown in FIG. 6.

The free end section of a connecting piece 6, which projects relative to the plate body 2, is configured as a coupling section 24 and is used to connect a cooling fluid line, which is able to be fastened to the coupling section 24.

In the embodiment of a connecting piece 6, as seen in FIG. 11, an abutment body is provided in the coupling section 24, which is designed in the form of an annular bead 25. The annular bead 25 is formed from the wall of the coupling section 24. A cooling fluid line, such as a cooling fluid hose, is able to be pushed onto the coupling section 24 and the abutment body integrated there in the form of the annular bead 25 and fastened by means of a suitable fastening means, for example a spring clamp.

The coupling section 24 of the connecting piece 6 is circular in cross section. In the embodiment of the connecting piece 6, as shown in FIG. 3 and FIG. 4, the circular cross section of the coupling section 24 continuously transitions into the connection section 7 and its cross-sectional configuration via a transition section 26.

For the cohesive joining of the connection section 7 in the receiving section 8, a solder material 20 in the form of a solder sleeve or a solder strip is applied to the connection section 7. The connecting piece 6 is positioned with the connection section 7 in the receiving section 7 of the plate body 2 and is connected thereto using mold soldering.

To produce a cooling plate 1 with at least one connecting piece 6, a connecting piece 6 is provided on which a connection section 7 is formed with two outwardly directed longitudinal webs 9 and arcuately rounded wall sections 16, 17. Furthermore, first and second plate elements 3, 4 are provided. The two plate elements 3, 4 are flat. At least one of the plate elements 3, 4 is provided with a solder material. Each plate element 3, 4 has a projecting shaped section 27. A receiving contour for the connection section 7 of the connecting piece 6 is formed in each of the shaped sections 27. A plate stack is formed from the two plate elements 3, 4, wherein the connection section 7 of the connecting piece 6 is arranged between the shaped sections 27 and the receiving contours provided there. A solder material 20 is applied to the connection section 7.

The plate elements 3, 4 are transferred to a heated mold soldering tool. For this purpose, a plate stack is able to be formed from the two plate elements with a connecting piece 6 incorporated between them outside of the mold soldering tool. The plate stack is also able to be formed in the mold soldering tool.

The plate stack or the plate elements 3, 4 and the connecting piece 6 with the positioned connection section 7 are inserted into the heated mold soldering tool. The connecting piece 7 of the connecting piece 6 is arranged between the plate elements 3, 4 in the receiving contours that complement a receiving section 8. The mold soldering tool has a lower tool and an upper tool. By closing the mold soldering tool, the plate stack is clamped between the upper tool and the lower tool and heated. The underside of the plate stack is in surface contact with the lower tool and its upper side is in surface contact with the upper tool.

When the mold soldering tool is closed, the shaped sections 27 are shaped in their final form in the area of the receiving contours of the plate elements 3, 4 and formed onto the outer contour of the connection section 7. This forms a joining gap 11 into which the solder material 20 is pressed. The formed shaped sections 27 complement each other to form the receiving section 8 with longitudinal grooves 10 which extend securely in the area of the joining plane FE between the plate elements 3, 4.

When the mold soldering tool is closed, the plate stack clamped between the lower tool and the upper tool is heated. A space between the plate elements 3, 4 of the plate stack is subjected to internal pressure. This is done by introducing an active medium, usually nitrogen, into a space between the plate elements 3, 4. As a result, a duct 5 is formed by internal pressure forming. When forming the duct, a plate element region of the upper plate element 3, which forms the duct plate, is formed into a duct cavity in the upper tool. Duct sections of the duct 5 run into one another in a loop and communicate between the connecting piece 6 shown here and another connecting piece, not shown.

During internal pressure forming in the mold soldering tool, the plate stack is able to be sealed circumferentially along adjacent edge regions and/or adjacent to the duct cavity and in the area of the receiving section of the plate elements 3, 4 by means of one or more pressure elements. Pressure elements are able to be provided as sealing strips in the upper tool and/or lower tool and are intended and meant for sealing the plate stack or the two plate elements 3, 4 circumferentially along the outer edge regions and adjacent to the duct cavity and the receiving section 8 with the connection section 7 of the connecting piece 6 received therein. Pressure elements are able to be implemented, for example, in the form of bead-shaped bodies.

The solder material applied between the plate elements 3, 4 and the solder material 20, which is applied between the receiving section 8 and the connection section 7, melts or has melted when the plate elements 3, 4 are heated. There is a firmly bonded connection between the joining partners. After the duct structure with the duct 5 has been formed and the soldering process has been completed, the mold soldering tool is opened and the cooling plate 1 is removed from the mold soldering tool.

The cooling plate 1 is able to be held and cooled in the mold soldering tool after opening the mold soldering tool and before removal. For this purpose, the duct plate 1 is able to be lifted from the lower tool by manipulator elements when or after opening the mold soldering tool, such that the contact between the lower tool and the still warm duct plate is eliminated. The upper tool is open and is no longer in contact with the cooling plate. After a holding or cooling time, the cooling plate 1 is then removed from the soldering tool.

To improve the soldering process, to limit the wetting of solder material or the outflow of solder material, a solder stop means 28 is able to be integrated into the arrangement of connecting piece 6 and receiving section 8. The solder stop means 28 is able to be formed by the annular bead 21, which rests on the front side of the opening 29 of the receiving section 8.

In at least one embodiment of the present disclosure, the solder stop means 28 is formed by a layer, a ring, or a sleeve made of a sealing metal material 30. FIG. 12 and FIG. 13 show such configurations. The solder stop means 28 is made of a sealing metal 30 which has a higher melting temperature than the solder material 20 of the first type. The solder stop means 28 is in the area of the opening 29 of the connection section 8 in the interior of the receiving section 8 arranged in front of the solder material 20.

In the embodiment shown in FIG. 13, the solder stop means 28 is arranged in the area of the opening 29 between the annular bead 21 and the solder material 20.

The sealing metal 30 is also able to be a solder material of the second type, which has a higher melting temperature than the solder material 20 of the first type. Due to its higher melting temperature of the solder material of the first type, the first type becomes viscous and plastically deformable under the influence of temperature in the soldering tool, such that a full-surface sealing effect is effected in the intended area of the mold soldering joint between connecting piece 6, connection section 7 and receiving section 8.

FIG. 14 shows a section of a plate body 2 with a view of a plate element 3 and the receiving section 8 formed in the shaped section 27. The connection section 7 of the connecting piece 8 is positioned in the receiving section 8.

The connection section 7 is configured in cross section as explained with reference to FIG. 6.

The connection section 7 tapers into a longitudinal section 32 via a transition section 31. In the longitudinal section 32, the connecting piece 6 is circular.

The receiving section 8 also has two length sections 33, 34 with different cross sections. A length section 33 on the plate body side is configured as described with reference to FIG. 6. Via a transition section 35, the plate body-side, internal length section 33 transitions into the opening-side length section 34, which is adapted to the circular contour of the length section 32.

A solder material 20 is applied to the connection section 7. The change in cross-section in the connection section 7 and in the receiving section 8 forms a solder stop means 28. The solder stop means 28 formed by the change in cross-section in the transition from the connection section 7 to the length section 32 and in the transition from the length section 33 to the length section 34 of the reception section 8 limits the solder flow during the production of the solder connection between the connecting piece 6 or the connection section 7 and the receiving section 8.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A heat exchanger plate, comprising:
a plate body; and
a receiving section, wherein
the plate body comprises at least two plate elements and a connecting piece for a cooling fluid, the connecting piece comprising a connection section joined at a joining plane area to the receiving section between adjacent plate elements of the at least two plate elements, the connection section comprising two outwardly directed longitudinal webs, the receiving section comprising longitudinal grooves extending in the joining plane area between the adjacent plate elements of the at least two plate elements, and the longitudinal webs extend in the longitudinal grooves.

2. The heat exchanger plate according to claim 1, wherein the longitudinal webs comprise triangular cross sections having concave web walls and a rounded tip.

3. The heat exchanger plate according to claim 1, wherein the longitudinal grooves comprise a funnel-shaped cross section having concave groove cheeks and a wedge-shaped groove base.

4. The heat exchanger plate according to claim 1, wherein the longitudinal webs and the longitudinal grooves are complementary.

5. The heat exchanger plate according to claim 1, wherein the connection section comprises convexly curved wall sections which extend between the longitudinal webs.

6. The heat exchanger plate according to claim 3, wherein the receiving section comprises convexly curved receiving wall sections connected to the groove cheeks.

7. The heat exchanger plate according to claim 1, wherein the connection section comprises wall sections that extend parallel to the joining plane area, which transition into the longitudinal webs at each end via the curved wall sections.

8. The heat exchanger plate according to claim 1, wherein the connecting piece comprises a stop on an end face of the receiving section.

9. The heat exchanger plate according to claim 1, further comprising a solder stop between the connecting piece and the receiving section.

10. The heat exchanger plate according to claim 1, wherein the connecting piece comprises a coupling section with an abutment body.

11. The heat exchanger plate according to claim 1, wherein the connecting piece comprises an annular bead stop on an end face of the receiving section.

12. The heat exchanger plate according to claim 10, wherein the coupling section comprises an annular bead.

13. A method of producing a heat exchanger plate, the method comprising:
providing a connecting piece comprising a connection section with two outwardly directed longitudinal webs;
providing plate elements comprising a first plate element and a second plate element, wherein each of the first plate element and the second plate element has a receiving contour for the connection section;
transferring the first plate element and the second plate element into a mold soldering tool, the mold soldering tool comprising a lower tool and an upper tool, wherein the connection section is between the first plate element and the second plate element, and a solder material is between the connection section and each of the plate elements;
closing the mold soldering tool and clamping the plate elements between the lower tool and the upper tool, wherein the receiving contour is shaped around the connection section, and a receiving section of the heat exchanger plate with longitudinal grooves extending in a joining plane area between the plate elements is formed;
heating the plate elements;
applying pressure to a gap between the plate elements by introducing an active medium into the gap via the connecting piece and forming a duct in at least one of the first plate element or the second plate element;
melting the solder material between the plate elements and between the connection section and the receiving section and joining to each other respectively by soldering;
opening the mold soldering tool and removing a cooling plate from the mold soldering tool.

14. The method according to claim 13, wherein the cooling plate is held and cooled in the mold soldering tool after opening the mold soldering tool and prior to removal from the mold soldering tool.

\* \* \* \* \*